United States Patent Office 3,547,633
Patented Dec. 15, 1970

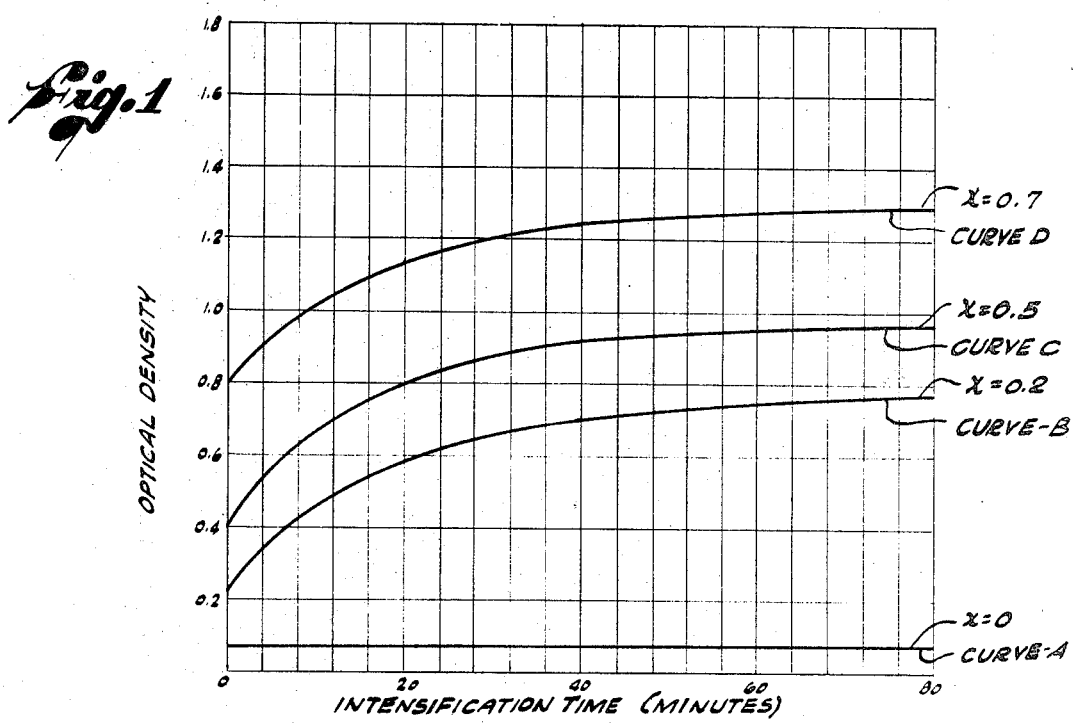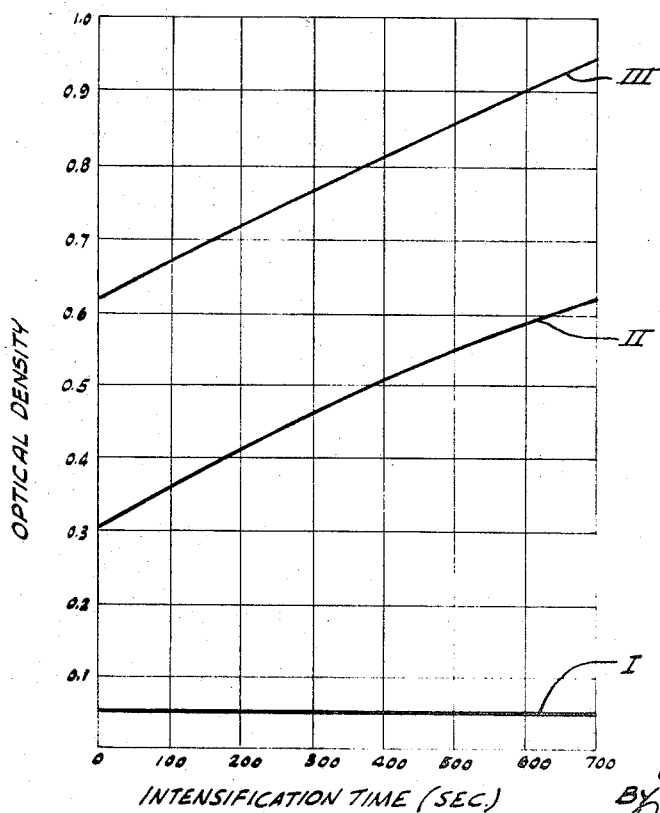

3,547,633
PHOTOCHEMICAL POLYMER
INTENSIFICATION PROCESS
John B. Rust, Los Angeles, Calif., assignor to Hughes
Aircraft Company, Culver City, Calif., a corporation
of Delaware
Filed Oct. 3, 1966, Ser. No. 583,696
Int. Cl. G03c 5/02, 1/68
U.S. Cl. 96—45.2                                   15 Claims

ABSTRACT OF THE DISCLOSURE

This disclosure relates to a method of obtaining image intensification in a photopolymerizable composition from a barely visible or latent image which may be produced by a relatively weak or short-life light exposure and the method of intensifying such image by partially desensitizing and secondary exposure of the image to visible radiation, means of fixation thereof, and products produced thereby.

---

The present invention relates to image intensification of photopolymerizable compositions. More particularly, this invention relates to an improvement in increasing the processing or film development speed by intensification of partially fixed photopolymer images formed in photopolymerizable compositions containing particular photoredox catalyst systems following image impressions of short duration or weak exposure and partial desensitization of such photopolymerizable compositions. This application is related to an improvement upon original applications, Ser. No. 450,397 and Ser. No. 483,986, now abandoned and replaced by application Ser. No. 824,902 and Ser. No. 824,903, respectively and relates to the copending applications filed concurrently herewith, entitled: "Photopolymer Fixation Process and Products," Ser. No. 583,649, John B. Rust; "Photopolymer Polymerization Fixation Process and Products," Ser. No. 583,-650, Leroy J. Miller and John B. Rust; and "Method of Inhibiting Photopolymerization and Products," Ser. No. 583,651, J. David Margerum, and assigned to the instant assignee (hereafter referred to generically as "said copending application," "Rust copending application," "Miller et al. copending application," or as "Margerum copending application"), there have been disclosed and described novel photosensitive compositions in which photopolymer images can be produced by irradiation with visible light, or lighted image, and which composition can then be completely desensitized to further irradiation with visible light by appropriate adjustment of the pH and temperature of such compositions. Each of said copending applications discloses photosensitive compositions comprising at least: a polymerizable vinyl monomer; a photo-redox catalyst system consisting of a catalyst and a photo-oxidant capable of absorbing visible light having wavelengths in the wavelength region lying between about 3800 A. and about 7200 A. and capable by absorption of such light of being raised to a photoactive level at which it is able to take an electron from the catalyst of the photo-redox catalyst system and thereby cause the said catalyst to result in a free radical capable of initiating polymerization of the vinyl monomer; and a pH lowering agent.

The Margerum copending application discloses the use of organic sulfinic compounds, triorgano-substituted phosphines and triorgano-substituted arsines as the catalysts in the aforementioned photo-redox catalyst system, in addition to disclosing the use of prior art reducing agents as the electron donor. The Miller et al. copending application discloses the use of similar organo sulfinic compounds and triorgano-substituted phosphines as catalysts, while the Rust copending application discloses the use of sulfinic acid compounds as the catalyst. Additionally, the Rust and Margerum copending applications disclose the inclusion of desensitizing agents in the photosensitive compositions. The Rust desensitizing agent is a soluble silver compound, whereas the Margerum desensitizing agent is a member of the 4-nitrophenyl carboxylic acid group or of the 2-nitrophenyl carboxylic acid group.

The use of the term "photo-redox catalyst system" herein will refer to the photo-redox catalyst systems of said copending applications just identified. The phrases "light-sensitive photopolymer composition," or "photosensitive compositions" as used herein will refer specifically to one or more compositions comprising a polymerizable vinyl monomer and a photo-redox catalyst system described in said copending applications. The subject matter of the said copending applications is incorporated herein by reference.

As disclosed in the said Rust and Miller et al. copending applications, complete desensitization of the therein described photosensitive compositions is accomplished by lowering the pH of the photosensitive compositions below about a certain value, and, preferably heating the photosensitive compositions, after photopolymer-forming exposure to visible light at a temperature substantially above room temperature. In said Margerum copending application, complete, but temporary, desensitization is accomplished by irradiating the photosensitive compositions with ultraviolet light to thereby produce a polymerization inhibitor intermediate form of the desensitizing agent to temporarily render the photosensitive composition insensitive to visible light.

The present invention relates to a method for image intensification in said light-sensitive photopolymer compositions after the light-sensitive compositon has been initially exposed and partially fixed to form a photopolymer image. In general, image production in light-sensitive photopolymer compositions may be achieved by exposing such compositions to visible light, or illuminate image, for a given exposure period which is dependent upon many factors, such as the nature of the composition and the intensity of the incident light. To produce an image which is readily discernible from its background, either light of high intensity or light of lower intensity must be used to irradiate the light-sensitive composition for moderate or relatively long exposure periods, respectively. Generally, the exposure time and the radiation intensity are within the control of an operator who can alter one or both variables to produce a clearly defined, readable image. However, in many applications the above variables cannot be changed or the changes that can be made cannot result in production of a clearly defined, readable image. That is, in some applications the incident exposure radiation, although of high intensity, is present for only extremely short time periods or the incident light is so weak that increasing the exposure time cannot compensate for the weakness of the light. For example, the radiation from a cathode-ray tube is very powerful, but it is present only for a time measured in milliseconds. The images produced in these situations are extremely faint and barely discernible from the surrounding background, or, in some cases, may be latent.

At present, no known prior art method exists to make use of the aforementioned extremes in light sources. Therefore, an intensification method, which can intensify faint or latent images so that they can communicate useful information, would greatly extend the range of light sources useful for exposing light-sensitive compositions, in addition to providing a novel method of producing an image, regardless of the characteristics of the light source.

In view of the foregoing limitations in the prior art, it is a major object of this invention to provide a method for increasing the speed of film processing by efficiently intensifying and fixing discernible or latent images produced by exposure and partial fixing of a light-sensitive polymerizable composition which contains an organic sulfinic, a triorgano-substituted phosphine, or a triorgano-substituted arsine photo-redox catalyst system.

It is a further object of this invention to provide a method for efficiently intensifying discernible or latent images produced by exposing light-sensitive, polymerizable compositions to image forming visible light, said light-sensitive compositions containing anorganic sulfinic, a triorgano-substituted phosphine, or a triorgano-substituted arsine photo-redox catalyst system, partially desensitizing the composition and applying further uniform intensification exposure. The term "partial desensitization" of the photosensitive composition, as used herein, and in the claims, is defined as that condition of a photopolymer mass or image wherein the unexposed areas have been rendered either wholly or partially nonpolymerizable, and wherein the previously exposed areas, are further uniformly irradiated with visible light, and the image intensified, that is, is increased in optical density relative to said unexposed areas, or background.

It is a still further object of this invention to provide an improved method of film processing by intensifying photopolymer images in partially desensitized light-sensitive polymerizable compositions comprising particular photo-redox catalyst systems and certain desensitizing agents therefore, which method is completely optical and which does not require the use of any additional agents in said light-sensitive photopolymerizable composition.

It is another object of this invention to provide an optical method for intensifying extremely faint or latent images formed by exposure of light-sensitive polymerizable compositions containing particular photo-redox catalyst systems to visible light, said method being employed after desensitization of the unexposed areas, either wholly or partly, by means of inclusion of certain desensitizing agents in such photosensitive compositions, so that the range of light sources used for initial image formation can be greatly expanded, for example, relatively weak or of short duration.

Other objects and advantages of this unique image intensification method will become apparent from the following description and from the drawing, in which:

FIG. 1 is a graphical representation illustrating the rate of intensification of an image produced in a light-sensitive photopolymer composition and fixed by heating the exposed photopolymer composition in the presence of a silver desensitizing agent; and FIG. 2 is a graphical representation illustrating the increase in intensification of an image produced in a light-sentivie composition containing another type of desensitizing agent.

It is now discovered that intensification of photopolymer images, formed by exposing the herein described light-sensitive compositions to visible light, may be brought about simply by optical means. Furthermore, it is discovered that such intensification may be produced, even though the unexposed areas of the exposed light-sensitive composition are only partially desensitized, rather than wholly desensitized. Specifically, image intensification is accomplished by: (1) first exposing a photosensitive composition containing a vinyl monomer, desensitizing agents (to be described hereafter) and an organic sulfinic, triorgano-substituted phosphine, or triorgano-substituted arsine photo-redox catalyst system, to visible light having wavelengths lying in the wavelength range between about 3800 A. and about 7200 A., until a photopolymer image is produced having an optical density less than the maximum optical density obtainable (thus, on the one hand, only a barely discernible or latent photopolymer image need be initially formed whereas, on the other hand, a readable image can be formed that has an optical density of less than that maximally obtainable); (2) partially desensitizing said light-sensitive composition by employing desensitizing agents, which agents are described in said copending applications; and (3) intensifying the photopolymer image by uniformly re-exposing the compositions to visible light in the wavelength range of about 3800 A. to about 7200 A. As previously noted, the partial desensitization step (2) need not completely desensitize the unexposed area of the composition, since this invention will intensify photopolymer images whether surrounded by partially desensitized backgrounds (i.e., unexposed areas) or by completely desensitized backgrounds.

As disclosed in said copending applications, initial exposure of a photosensitive composition to visible light (step (1)) is continued until a photopolymer image having a desired optical density range is produced. However, in this invention, the initial exposure of the photosensitive composition to visible light may be, but need not be, continued for as long a time as described in said copending applications. In fact, for the purposes of this invention, the initial exposure step need only be continued until a barely discernible or latent photopolymer image is formed. The time required for the initial exposure of this invention will depend upon the intensity of the irradiating light which can vary over a wide range of intensities. For example, where light intensities of the order of $1 \times 10^{-6}$ watts/cm.$^2$ are used, photopolymer images suitable for intensification by the herein described process may be produced in a few seconds.

Initial exposure of the photosensitive compositions to visible light may be continued until photopolymer optical densities, ranging from as low as about 0.05 up to, but less than the maximum optical density obtainable in a particular photosensitive composition, have been achieved. However, the advantages of intensifying photopolymer images by the method of this invention decrease with increasing initial optical density of the photopolymer image. As will be further shown, optimum results are produced by the method of this invention when intensifying photopolymer images having initial optical densities lying between about 0.05 and about 0.8, although significant intensification may be achieved with photopolymer images having initial optical densities substantially above 0.6.

The photosensitive compositions employed herein have been described generally heretofore and specific compositions will be described in greater detail hereafter.

The partial desensitizing step (2) requires the presence of certain desensitizing means. These will now be generally described.

It should first be noted that in the Miller et al. copending application, complete desensitization is accomplished by including a sufficient amount of pH lowering agent in the photosensitive composition to lower the pH of such composition to below about pH 7 and thereafter, heating the photosensitive composition having a pH less than about 7 at an elevated temperature, e.g., 80° C., until the composition is completely fixed or desensitized to visible light. Complete desensitization is also accomplished by the method described in the copending Rust application by including in the photosensitive composition both a pH lowering agent to provide a pH below about 8, and a soluble silver compound and by either storing the photosensitive composition or by heating the photosensitive composition for periods sufficiently long to completely fix and desensitize the composition to further irradiation with visible light. Complete (although temporary) desensitization is further accomplished in the Margerum copending application by irradiating a photosensitive composition containing a 4-nitrophenyl or 2-nitrophenyl carboxylic acid compound, with radiation having wavelengths between about 2000 A. and about 4000 A. for a period sufficiently long to completely desensitize the composition to visible light.

It has now been found, completely unexpectedly, that if the desensitizing time is reduced below that required to provide complete desensitization by any of the methods of said copending applications, further polymerization at the photopolymer nuclei (which were produced during the initial exposure) may still take place when the composition is uniformly exposed to visible light. However, the desensitizing means previously described act to render the monomer, i.e., the unexposed areas, wholly or partially insensitive to further exposure to visible light. Thus, the distinction herein appears to lie in the discovery of irradiating an incompletely desensitized photopolymerizable composition to intensify an image or enabling a better image from a photopolymerized composition having a weak image impression therein, or intensify an image relative to its background without destroying the contrast, thereby permitting more rapid processing and use of light sources not heretofore permissible for practical results.

Intensification of the photopolymer image, that is, increasing the optical density of the photopolymer image in relation to the optical density of the initially unexposed areas, is accomplished by uniformly irradiating the partially desensitized composition with visible light (step (3)). The intensity of the visible light (light having wavelengths lying between about 3800 A. and about 7200 A.) employed during the intensification step may vary within a wide range of intensities. For example, the intensification light intensity may be as low as the intensity of the light used initially for image formation, e.g., about $1 \times 10^{-6}$ watts/cm.$^2$. However, intensification employing such light intensities requires, for most purposes, an impractically long time. To intensify a photopolymer image in a few minutes, much higher light intensities are required due to the reduced activity of the catalyst system. For example, intensification light intensities of about $1 \times 10^{-2}$ watts/cm.$^2$ to about $1 \times 10^{-1}$ watts/cm.$^2$ are required for rapid intensification.

The reason for the image intensification resulting from the method of this invention is not completely understood. It is possible that, upon initial exposure of the photosensitive compositions, a secondary catalytic agent or system, which has reduced catalytic activity and is not removed in the partial desensitization step, is created from the photo-redox catalyst system components. However, any explanation of the phenomenon must not be construed as altering or affecting the spirit and scope of this invention.

Whatever the nature of the aforesaid secondary catalytic agent or system, it appears that its activty is closely associated with the production of polymer nuclei. That is, intensification is produced substantially only in areas where measurable polymerization has occurred. Thus, uniform re-exposure of a partially desensitized composition will cause the image to intensify in relation to the previously unexposed areas, whether such unexposed areas have been rendered completely or partly insensitive to visible light. For example, when the initially unexposed areas of the photosensitive composition have been completely desensitized, further uniform irradiation of the composition with visible light increases the optical density of the partially desensitized photopolymer image without altering the optical density of such initially unexposed areas. That is, the optical density of the initially unexposed areas remains constant while the optical density of the photopolymer image increases, thereby resulting in intensification of the photopolymer image.

If the unexposed areas of the light-sensitive composition are only partially desensitized, radiation, used for intensification may also cause polymerization of the previously unexposed monomer. Any such polymerization causes some increase in background fogging. However, the photopolymer image increases in optical density more quickly and to a greater extent than the background. The overall effect is that the image is intensified with respect to the background.

Whether substantially complete desensitization or only partial desensitization of the unexposed areas is employed prior to intensification exposure will depend upon the particular application for which the image is being produced and intensified. If the use is concerned primarily with information carried by the image and less about the appearance of the "photograph," partial desensitization of the unexposed areas may be used. This is especially true where rapid development of the image is important, since partial desensitization of the unexposed areas can be performed in substantially less time than complete desensitization. Where, however, appearance of the "photograph" is of prime importance, the unexposed areas of the light-sensitive composition should be substantially completely desensitized before intensification.

When one point in a photopolymer image is compared to a second point in the same image, both before and after intensification, it has been found that when the optical densities at the two points have a density difference of less than about 1, there is no convergence after intensification. That is, such points tend to maintain the same difference in optical density relative to each other. This phenomenon results in an intensified image which faithfully reproduces the information carried in the faint image before intensification.

The basic photosensitive composition components (polymerizable vinyl monomer and photo-redox catalyst system) utilizable in the process of this invention will first be described in detail.

Turning first to the polymerizable monomers, these monomers are described in said copending applications. Such monomers will be referred to herein by the term "vinyl monomers," and this term includes such monomers as vinylidene chloride, vinyl methyl ether, vinyl butyl ether, vinyl butyrate, styrene, vinyl benzoate, methyl methacrylate, calcium diacrylate, barium diacrylate, acrylic acid, acrylonitrile, acrylamide, mixtures of the same and the like.

The amount of vinyl monomer in the reaction medium can vary within extremely wide limits. On the one hand, the amount of monomer, or monomers, employed may be the maximum solubility of the particular monomer material in the particular solvent utilized in the photosensitive composition. On the other hand, the monomer may be present in small molar concentrations of the order of $10^{-2}$ or $10^{-3}$ molar. In general, it is preferable to use relatively high monomer concentrations (greater than about $2.5 \times 10^{-3}$ molar) because it has been found that the rate of photopolymerization materially decreases at lower monomer concentrations.

It is highly desirable to utilize monomers having a functionality greater than two, so that highly cross-linked polymers which are insoluble and infusible are obtained at a low degree of conversion. It is known that the greater the functionality of a monomer, the lower the degree of conversion at the gel point( or the point at which insolubility of the polymer sets in). This being the case, a discernible photographic image is obtainable by the process of the present invention at low light levels and in short periods of time, when monomers of high functionality are employed. Monomers having a functionality higher than two are typified by: N,N'-alkylenebisacrylamides, secondary acrylamides, tertiary acrylamides, di- or trivalent metal salts of acrylic or methacrylic acid and the like. Such polyfunctional compounds are generally designated in the art as "cross-linking" agents.

The cross-linking agent may be used alone or in conjunction with monomers having a functionality of two. Where the latter combination is used, the cross-linking agent is generally employed in an amount ranging from 10 to 50 parts of bifunctional monomer to one part of cross-linking agent.

In general, the photo-redox catalyst system utilized in this invention is the same as described in each of said copending applications. That is, the photo-redox catalyst system comprises a photo-oxidant and a catalyst, as previously described herein. In general, the catalysts utilizable in this invention are organic sulfinic acids and derivatives thereof, triorgano-substituted phosphines or triorgano-substituted arsines, as described in said copending applications and incorporated herein by reference. Unless otherwise stated, the term "catalyst" will herein and in the claims designate members of the foregoing groups.

The term "organic sulfinic compounds" as used herein and in the claims includes the aromatic and aliphatic organic sulfinic acids and derivatives thereof and have been described in detail in the said copending applications. Thus, the derivatives of the organic sulfinic acids which can be employed are sulfinyl halides, sulfinamides, salts and organic esters of the organic sulfinic acids, as well as adducts of sulfinic acids with carbonyl compounds and especially aldehydes. Each of these organic sulfinic compounds is characterized by its ability to form a free radical by giving up an electron to the photo-oxidant in its activated or photoactive state. The free radicals so derived from the organic sulfinic compounds are capable of initiating polymerization of the aforedescribed vinyl monomers.

Examples of the organic sulfinic acids are: p-toluenesulfinic acid, benzenesulfinic acid, p-bromobenzenesulfinic acid, naphthalenesulfinic acid, 4-acetamidobenzenesulfinic acid, 5-salicylsulfinic acid, ethanesulfinic acid, 1,4-butanedisulfinic acid, and α-toluenesulfinic acid. The salts of these acids may be any of the soluble salts which are compatible with the other components employed in the photosensitive solution and typically include the sodium salts, the potassium salts, the lithium salts, the magnesium salts, the calcium salts, the barium salts, the silver salts, the zinc salts and the aluminum salts. Appropriate esters of these acids typically include the methyl esters, the ethyl esters, the propyl esters and the butyl esters.

The sulfinyl halides include sulfinyl chlorides, for example, ethanesulfinyl chloride, and sulfinyl bromides, for example, 5-salicylsulfinyl bromide. The sulfinamides include, for example, ethanesulfinamide, the N-alkylsulfinamides, such as N-methyl-p-toluenesulfinamide, and N-arylsulfinamides, such as N-phenylbenzenesulfinamide. Aldehyde adducts of these sulfinic acids are, for example, the adducts formed with formaldehyde, acetaldehyde, isobutyraldehyde, heptaldehyde, and the like.

Examples of the triorgano-substitute phosphines employed in this invention are the aliphatic and aromatic derivatives of phosphine. For example, tributylphosphine, triphenylphosphine, dibutylphenylphosphine, methyldiphenylphosphine, methylbutylphenylphosphine, and the like, may be used. Examples of the triorgano-substituted arsines employed in this invention are the aliphatic and aromatic derivatives of arsine such as triphenyl arsine, methyldiphenyl arsine, trioctylarsine, dibutylphenyl arsine and methylbutylphenyl arsine.

As mentioned in the copending applications, only catalytic amounts of the catalysts are needed in the photoredox catalyst system for photopolymerization. Thus, photo-redox polymerization, according to the present invention, may be achieved by using concentrations of the catalyst as small as $10^{-6}$ moles per liter of photosensitive solution. Hereafter, moles per liter will be used to designate "moles per liter of photosensitive solution". Hence, when measured against the quantity of the monomer, the amount of the reducing agent can be exceedingly small. As an example, one-tenth of a millimole of organic sulfinic compound catalyst per liter of solution has been used to achieve a very satisfactory rate of photopolymerization. Higher concentrations, e.g., $10^{-2}$ molar, may result in somewhat accelerated rates of photopolymerization.

The photo-oxidant compounds for use in the photoredox catalyst system of this invention are any of those compounds that absorb sufficient radiation within the wavelengths of about 3800 A. to about 7200 A. to thereby attain a photoactive or photo-oxidant level, provided that at such level, the photo-oxidant compounds are capable of reacting with the catalysts, as heretofore defined, to remove an electron therefrom causing said catalyst to produce a polymerization-initiating, highly reactive free radical.

The specific photo-oxidants usable in the process of this invention are those disclosed in the copending applications and are incorporated herein by reference. More specifically, they are members of the quinoidol dye family such as phenothiazine dyes, phenazine dyes, acridine dyes, xanthene dyes, phenoxazine dyes and pyronine dyes. The minimum required concentration of photo-oxidant of the photo-redox catalyst system is approximately $10^{-7}$ moles per liter.

As previously noted herein and as more fully described in said copending applications, certain desensitizing means are included in the photosensitive compositions. Such desensitizing means include pH-lowering reagents (Miller et al.), soluble silver salts (Rust) and members of the group consisting of 4-nitrophenyl carboxylic acids, 2-nitrophenyl carboxylic acids and ionizable derivatives thereof (Margerum). It will be understood that these desensitizing means are effective with selected groups of the aforedescribed catalysts as described in said copending applications.

The pH-lowering agents include strong and weak acids, inorganic acids and water soluble organic acids. For example, the following acids may be used: hydrochloric acid, sulfuric acid, phosphoric acid, formic acid, acetic acid and acrylic acid. The pH-lowering reagents may also be latent reagents capable of dissociating an acid group therefrom when heated. For eample, the following latent pH-lowering reagents may be employed: 1,3-dichloro-2-propanol, chloroacetic acid and dichloroacetic acid, or suitable mixtures, and combinations of such pH-lowering material may be used where feasible in the composite monomer solution.

The silver compounds which must be soluble in the solvents employed in the particular photosensitive compositions may be organic or inorganic. For example, silver iodide, silver nitrate, silver acetate and silver benzoate may be used as the silver desensitizin agent. Silver may be present in the particular photosensitive compounds in amounts ranging from about $1 \times 10^{-4}$ moles per liter to about the solubility of the silver compound in the solvent in the particular photosensitive composition.

The desensitizing agents described in the said Margerum copending application are compounds capable of temporarily inactivating the heretofore described photoredox catalyst systems when irradiated with light having wavelengths lying between about 2000 A. and about 4000 A. As examples of these desensitizing agents, the following 4-nitrophenyl and 2-nitrophenyl carboxylic acids and derivatives thereof may be used: 4-nitrophenylacetic acid, 4-nitrohomophthalic acid, 4,4-dinitrodiphenylacetic acid, 2-(4'-nitrobenzyl) benzoic acid, 5-nitro-o-toluic acid, 4,4'-dinitrobibenzyl-2',2-dicarboxylic acid, 4'-(4'-nitrobenzyl) benzoic acid, 2-(2'-nitrobenzyl) benzoic acid and sodium 2-(2'-nitrobenzyl) benzoic acid. The concentration of the desensitizing agent may vary from as low as $1 \times 10^{-4}$ moles per liter to as high as the solubility of the desensitizing agent in the particular photosensitive composition.

The foregoing components (vinyl monomer, photooxidant, catalyst, desensitizing agent) may be combined in any convenient order. For example, the monomer may be initially combined with a photo-oxidant, and the catalyst and desensitizing agent may be added later. When a particular step produces a light-sensitive composition, that step and all subsequent steps must be performed in the dark.

The process of the present invention is preferably carried out in a solvent medium, i.e., a uniformly mixed composite solution of the involved compounds, preferably in film form as exemplified by cell structure hereinafter described. The particular solvent employed will be one that is compatible for the components of this invention. Thus, if the monomer, the photo-redox catalyst system, and the desensitizing component are water soluble, such as in a system employing, for example, acrylamide as the monomer, and thionine as the photo-oxidant, sodium p-toluene-sulfinate as the catalyst, acrylic acid as the pH-lowering agent and silver nitrate, an aqueous solution may be employed. Where a common solvent for the monomer, photo-redox catalyst system, pH-lowering agent and desensitizing agent is not available, different solvents which are miscible with each other may be employed. Water, alcohols, such as methanol, glycerol, ethylene glycol, dioxane, and the like have been used as sutiable solvents in the process of the present invention.

The intensification process of this invention will now be described in detail. As previously noted, intensification by the method of this invention faithfully reproduces the information carried in a faint or latent photopolymer image. This is illustrated by the curves of FIG. 1 derived from Example 2, which is briefly summarized as follows. A photosensitive composition containing a sulfinic acid salt as the catalyst and a soluble silver salt as the desensitizing agent was divided into several parts and each part was placed in a separate container or cell. The cell were exposed to visible light for varying periods to provide different initial optical densities, with the exception of one cell which was used as a reference and therefore was not exposed to visible light. All cells were heated at 82° C. for eight minutes to partially desensitize the photo-redox catalyst system. Each cell was then uniformly irradiated with visible light and the changes in optical density of each cell were recorded and graphically depicted in Curves B, C and D of FIG. 1 hereof. Curve A which was not initially exposed to visible light prior to the desensitization step.

The general equation for determining optical density at any time during the intensification irradiation is:

$$D = D_S - (D_S - D_I)e^{-at}$$

where $D$ is the potical density at intensification time $t$; $a$ is an arbitrary constant; $D_S$ is the saturation optical density at infinite time; and $D_I$ is the initial optical density or the optical density at zero intensification time. Applying this data to the foregoing general equation produces the following specific equations showing the actual optical density time relationships for each cell.

Curve B:
$$D = 0.745 - 0.523e^{-0.06t}$$
Curve C:
$$D = 0.97 - 0.57e^{-0.06t}$$
Curve D:
$$D = 1.29 - 0.5e^{-0.06t}$$

The data thus indicates that $a$ has the same value (0.06), even though the initial exposure times were different for each curve; that is, even though the initial optical density ($D_I$) was different for each cell. This indicates that the intensification appears to occur uniformly over a wide range of initial exposures.

It has been found that the relative amount of intensification, i.e., optical density increase, decreases when the image forming exposure time is sufficient to produce relatively optically dense photopolymer images, e.g., photopolymer images having an optical density above about 0.6. Conversely, the largest relative optical density changes are produced where the image forming exposure time is relatively short. This phenomenon is illustrated by the curves of FIG. 1. As shown by FIG. 1, the initial optical density after image forming exposure for Curves B, C and D was 0.22, 0.39 and 0.80, respectively, for exposure times of 0.2, 0.5 and 0.7 second, respectively. After a twenty-minute intensification exposure, the optical densities of the points represented by Curves B, C and D increased to 0.58, 0.80 and 1.14, respectively. Thus, it can be seen that intensification produced an optical density increase of 0.36 for Curve B, of 0.41 for Curve C and of 0.34 for Curve D. These optical density increases represent percent increases of 164%, 105% and 43% for the twenty-minute points on Curves B, C and D, respectively. Thus, it will be seen that the largest relative increases in optical density are produced by intensifying points of relatively low optical density.

As shown by the foregoing, highly visible images having optical densities of 0.5 and higher can be produced by the intensification method of this invention from photopolymer images having relatively low optical densities. Because the optical density produced during the photopolymerization step is proportional to the amount of incident light absorbed by the photosensitive composition, and because intensification by the method of this invention produces highly visible images from initially barely visible or latent images, light for the photopolymerization step may be very weak, or it may have a very short life. For this reason, the intensification method may utilize light sources, as image forming energy sources, which are not utilizable as image forming light sources by the prior art.

The effectiveness of the intensification method of this invention depends upon the steps which precede it, i.e., upon the image forming exposure step and upon the desensitization step. Intensification by the herein described method presupposes that a barely visible or latent photopolymer image will usually be first produced in the photosensitive composition. It is further hypothesized that secondary catalytic agents are produced in the composition during the image forming step and that these secondary catalytic agents be retained in the barely discernible or latent photopolymer image in the photosensitive composition after the partial desensitization step.

To produce at least a barely discernible or latent photopolymer image, the image forming exposure time must be at least equal to the induction time associated with the photosensitive compositions at wavelengths of maximum intensity in the visible light employed for the initial exposure. Hereafter, and in the claims, the term "induction period" will be equivalent to the induction period associated with the photosensitive composition at the wavelength of maximum intensity in the exposure light. The induction time is the time required to eliminate the inhibitors in the photosensitive composition and to start photopolymerization of the vinyl monomer. Induction periods may be of the order of seconds and, in some cases, of the order of minutes. Preferably, the image forming exposure time is at least slightly longer than the induction period so that a barely discernible or latent image is formed.

The intensification method of this invention is of great utility when a photopolymer image of low optical density, e.g., about 0.05 to about 0.8 is produced by the image forming exposure. Therefore, the image forming exposure time should be longer than the induction period but need only be long enough to produce an image of low optical density.

The following examples further illustrate the method and compositions of this invention.

EXAMPLE 1

This example illustrates the ability of the intensification method to produce images which have optical densities many times the optical densities of the preintensified images, even though the presensitized image is barely discernible. Furthermore, this example illustrates the substantial lack of background fogging in photosensitive compositions containing silver during intensification by the method of this invention.

Each of the faint images initially produced in this example was desensitized using different temperatures and times to further illustrate the scope of the invention.

A photo-redox catalyst solution was prepared as follows:

A solution (A) was prepared by dissolving 35 gm. of 45% aqueous polyvinylpyrrolidone solution known as Type NP–K60 in 70 ml. of distilled water. Then 1.499 gm. of sodium p-toluenesulfinate dihydrate and 0.082 gm. of thionine were placed in a 100 ml. volumetric flask and the aqueous polyvinylpyrrolidone solution added up to the 100 ml. mark. The solution was warmed and stirred to obtain a clear blue, homogeneous solution.

A thickened monomer solution (B) was prepared by adding 2 gm. of 45% aqueous polyvinylpyrrolidone solution to 16 ml. of barium diacrylate solution containing 0.5 gm. of barium diacrylate per ml. of solution. A clear, homogeneous solution was obtained by warming and stirring for about fifteen minutes.

A light-sensitive composition (C) was prepared in the dark by mixing:

1 ml. of photocatalyst Solution A,
4 ml. of thickened monomer Solution B, and
1 ml. of 0.1 molar aqueous silver nitrate solution.

The light-sensitive composition C was stirred to give a homogeneous solution which was placed in a vacuum jar to which a slight vacuum was applied to remove air bubbles. The solution was then poured onto a 2″ x 2″ glass plate with a peripheral shim of 5 mil thick polyethylene terephthalate plastic known as "Mylar." Another glass plate was sealed on top to make a cell containing a 5 mil thick film of the light-sensitive composition.

One cell was exposed to a projected photographic negative using white light having an intensity of about $10^{-3}$ watts/cm.$^2$ at the cell surface. The exposure time was four seconds, giving a very faint image. The cell was heated in an oven in the dark for fifteen minutes at 80° C. Thereafter, the cell was placed in a slide projector with a 500-watt light source. When first projected the image was faint, but as projection was continued, the projected image was seen to intensify so that within fifteen minutes, it had increased in optical density about three times the original. The unexposed background did not fog or darken.

Another cell was exposed to a projected photographic negative using the same light for four seconds. The cell was then stored in the dark at room temperature for twenty hours. It was then placed in a slide projector with a 500-watt light source and projected on a screen. When first viewed, the image was weak, but upon continued exposure to the intense light the image intensified so that at the end of thirty minutes the denser portions of he image had optical densities in the neighborhood of two which corresponded to an increase in optical density of about five times. Very little noticeable fogging or darkening of the background could be observed.

Still another cell was exposed to the same projected photographic negative using the same light intensity as above. The exposure was for one second and then the cell was placed in an oven at 65° C. for fifteen minutes in the dark. It was then projected from a slide projector with a 500-watt light source. The image was scarcely discernible when first projected, but on continued exposure to light in the projector it intensified rapidly so that in about twenty minutes of projection the optical densities of he image had increased to almost ten times their original values, and the unexposed background had remained substantially unaltered and unfogged.

EXAMPLE 2

This example illustrates the proportional increase in optical density for points initially varying from each other in optical density when the faint images at these points were intensified by the method of this invention. Again, the lack of background fogging is shown.

A photo-redox catalyst Solution A was prepared from: 2.14 gm. sodium-p-toluenesulfinate dihydrate and 0.025 gm. thionine. The ingredients were placed in a 100 ml. volumetric flask and about 70 ml. of 97% glycerol added. A homogeneous, clear blue solution was secured by warming and stirring for about thirty minutes. The solution was cooled and sufficient 97% glycerol was added to make 100 ml. of solution.

A thickened monomer Solution B was prepared by mixing: 16 ml. of aqueous barium diacrylate solution containing 0.5 gm. of barium diacrylate per ml. and 2 gm. of 45% aqueous polyvinylpyrrolidone known to the trade as Type NP–K60. The mixture was stirred to secure a clear, homogeneous solution.

A light-sensitive Solution C was prepared in the dark by mixing: 1 ml. of photocatalyst Solution A, 4 ml. of monomer Solution B, and 1 ml. of 0.1 molar aqueous silver nitrate solution.

The solution was thoroughly stirred to obtain a clear blue, homogeneous solution. The solution was placed in glass cells formed from two thin glass plates separated by 6 mil thick plastic peripheral shims and sealed around the edges after filling. The cells were respectively exposed to a spot of white light having an intensity of about $2 \times 10^{-2}$ watts/cm.$^2$ at the cell surface. The exposure times were 0.2, 0.5 and 0.7 second respectively. The cells were then heated in an oven at 82° C. for eight minutes to bring about desensitization. After cooling they were exposed uniformly over the whole surface to white light having an intensity of about $2 \times 10^{-2}$ watts/cm.$^2$ at the cell surface and the time of illumination was recorded. At intervals during illumination the optical densities of the initially exposed spots were determined on a densitometer. The background, or portion of the area initially unexposed, was monitored with the densitometer.

The resulting data were plotted and are shown in FIG. 1 wherein: Curve A represents the unexposed background; Curve B represents the 0.2 second initial exposure sample; Curve C represents the 0.5 second initial exposure sample; and curve D represents the 0.7 second initial exposure sample.

As is evident from FIG. 1, the Curves B, C, and D are approximately parallel to each other thereby indicating that the increase in optical density at each point, in absolute terms, is about the same.

EXAMPLE 3

This example illustrates the effect of intensifying by the method of this invention a photopolymer image produced in a photosensitive composition which contained a triorgano-substituted phosphine and which was desensitized solely by reducing the pH below 7. By comparison, Examples 1 and 2 employed a silver compound in addition to lowering the pH to desensitized the photosensitive composition.

A Solution A of barium diacrylate was prepared by adding: 78.7 grams of barium hydroxide octahydrate in 78.7 ml. of 1-propanol to 36.0 ml. of distilled acrylic acid. The solution was stirred for 1½ hours at a temperature of 60–70° C. and filtered. A small amount of acrylic acid was added to adjust the pH at 6.7.

A solution (B) of methylene blue was prepared by dissolving 0.0312 gram of methylene blue in 100 ml. of 1-propanol.

A triphenylphosphine solution (C) was prepared by dissolving 2.6194 grams of triphenylphosphine in 100 ml. of 1-propanol.

A photosensitive solution (D) was prepared by mixing 3.5 ml. of Solution A, 0.5 ml .of Solution B, 0.5 ml. of Solution C and 0.5 ml. of water.

Portions of Solution D were used to fill glass slide containers. These slides were prepared by using 7 mil plastic tape as a shim around the outer edges of 2″ x 2″ glass plates, leaving the center portion as a well. In each case a second glass plate was used as a cover, and the two plates were taped firmly together. The photosensitive compositions of two slides were polymerized to an optical density of 0.3 (Slide II) and 0.6 (Slide III), while a third slide (Slide I, background) was unexposed. The slides were then stored in the dark as follows: slide I, 100 min.; slide II, 115 min.; slide III, 130 min. Following the storage period during which inactivation took place, the specimens were exposed to white light having an intensity of 10.45 milliwatts/cm.² A photo-multiplier tube was employed to measure the density intensification which occurred during exposure. The increase in optical density which was observed during exposure of the previously exposed slides is illustrated graphically in FIG. 2.

From the foregoing description and drawings, it can be seen that a novel method for intensifying barely visible or latent photopolymer images has been provided, as well as photopolymer images of higher optical density, which images have been produced in photosensitive compositions containing a vinyl monomer, a photo-redox catalyst system, and a desensitizing means, as described herein. As described, intensification is carried out after such commpositions have been partially desensitized by an appropriate method, as described herein. Intensification of photopolymer images in photosensitive compositions may be accomplished whether the initially unexposed areas are completely or partly rendered insensitive to visible light, because intensifications by the method of this invention appear to be associated with photopolymer nuclei, i.e., exposure during the intensification step has negligible effect on the unexposed background of the photosensitive composition, while simultaneously greatly increasing the optical density of the exposed areas. Furthermore, it has been shown that exposed areas in a photosensitive composition having optical density differences of less than about one are intensified about equally, i.e., optical density convergence is negligible, thereby preserving photopolymer image definitions.

As previously noted, the intensification method of this invention is capable of substantially intensifying even barely discernible photopolymer images. This result permits the use, as image forming light sources, of light sources which are either very weak or which have a very short life and which heretofore were incapable of being used to form useful photopolymer images. In addition, the improvement provides an increase of film speed or amplification of fixed weak and latent images with faster processing.

While certain embodiments are disclosed herein, modifications which lie within the scope of this invention will occur to those skilled in the art. I intend to be bound only by the scope of the claims which follow.

What is claimed is:

1. A method of photo-imaging a photopolymerizable material, said material comprising a supported film layer, said layer comprising (1) an addition polymerizable, ethylenically unsaturated compound being capable of forming a high polymer by free-radical initiated, chain propagating addition polymerization, (2) a free-radical generating addition polymerization initiator combination activatable by radiation having a wavelength between about 3800 A. and about 7200 A. comprising a photo-oxidant dye and a catalyst compound therefore selected from the group consisting of (a) an aromatic or aliphatic sulfinic acid, or inorganic salts and organic esters thereof, sulfinic halides, sulfinamide and an adduct derived from the combination of an aromatic or aliphatic sulfinic acid with a carbonyl compound, and (b) a triorganic aryl and alkyl substituted phosphines, and (3) a sufficient amount of a pH lowering agent to adjust the pH of said layer to pH of less than 7 during the heating step, the method comprising the following steps:

(A) imagewise exposing the said photopolymerizable material to radiation having a wavelength between about 3800 A. and about 7200 A. for a time sufficient to substantially initiate photopolymerization in the exposed area;

(B) subjecting said imaged photopolymerizable material to uniform temperature between about 20° C. and about 100° C. for a sufficient time to cause said polymerization initiator combination in the relatively unexposed area to become substantially insensitive to radiation having wavelengths between about 3800 A. to about 7200 A.; and (C) uniformly exposing said imaged and heated photopolymerizable material to substantially intense radiation having wavelengths between about 3800 A. to about 7200 A. for a sufficient time to produce an intensified photopolymer optical image by substantial increase in optical density in the area exposed during the imagewise exposure step, said process steps produce a visible optical image of relatively fixed density.

2. The process of claim 1 wherein said catalyst compound is an organic sulfinic compound.

3. The process of claim 1 wherein said optical density of said photopolymer image produced by said imagewise exposure lies between about 0.05 and about 0.8.

4. The process of claim 1 wherein said monomer is a salt of a polyvalent metal compound.

5. A method of photo-imaging a photopolymerizable material, said material comprising a supported film layer, said layer comprising (1) an addition polymerizable, ethylenically unsaturated compound being capable of forming a high polymer by free-radical initiated, chain propagating addition polymerization, (2) a free-radical generating addition polymerization initiator combination activatable by radiation having wavelengths between about 3800 A. and about 7200 A. comprising a photo-oxidant dye and a catalyst compound therefore selected from the group consisting of (a) an aromatic or aliphatic sulfinic acid, or inorganic salts and organic esters thereof, sulfinic halides, sulfinamide and an adduct derived from the combination of an aromatic or aliphatic sulfinic acid with a carbonyl compound, (3) a sufficient amount of pH lowering agent to adjust the pH of said layer to pH of less than 8 during the heating step, and (4) a nonpolymerization initiating silver compound soluble in a coating solvent for said layer and being capable of accelerating the desensitization reaction during heating, the method comprising the following steps:

(A) imagewise exposing the said photopolymerizable material to radiation having a wavelength between about 3800 A. and about 7200 A. for a time sufficient to substantially initiate photopolymerization in the exposed area;

(B) subjecting said imaged photopolymerizable material to uniform temperature between about 20° C. and about 100° C. for a sufficient time to cause said polymerization initiator combination in the relatively unexposed area to become substantially insensitive to radiation having wavelengths between about 3800 A. to about 7200 A.; and (C) uniformly exposing said imaged and heated photopolymerizable material to substantially intense radiation having wavelengths between about 3800 A. to about 7200 A. for a sufficient time to produce an intensified photopolymer optical image by substantial increase in optical density in the area exposed during the imagewise exposure step, said process steps produce a visible optical image of relatively fixed density.

6. The process of claim 5 wherein said optical density of said photopolymer image produced by said imagewise lies between about 0.05 and about 0.8.

7. The process of claim 5 wherein said catalyst compound is an organic sulfinic compound.

8. The process of claim 5 wherein said catalyst compound is a triorganosubstituted arsine selected from the group consisting of triphenyl arsine, methyldiphenyl arsine, trioctylarsine, dibutylphenyl arsine and methylbutylphenyl arsine.

9. The process of claim 5 wherein said monomer is a salt of a polyvalent metal compound.

10. A method of photo-imaging a photopolymerizable material, said material comprising a supported film layer, said layer comprising (A) a photopolymerizable ethylenically unsaturated monomer capable of polymerization by free radical initiated addition polymerization, (B) a photopolymerization initiator system, said system comprising (1) a photo-oxidant dye capable of being raised to a photoactive state by the absorption of radiation having wavelength between about 3800 A. to about 7200 A. and (2) a reducing agent for the said dye, or a catalyst for the said dye selected from the group consisting of (a) an aromatic or aliphatic sulfinic acid, or inorganic salts and organic esters thereof, sulfinic halides, sulfinamide and an adduct derived from the combination of an aromatic or aliphatic sulfinic acid with a carbonyl compound, (b) triorganic aryl and alkyl substituted phosphines, and (c) triorganic aryl and alkyl substituted arsines, and (C) an ionizable nitro group substituted aryl carboxylic acid compound or soluble salt thereof in an ionizing carrier medium which is capable of preventing the initiator system from polymerizing said monomer by a nitrobenzyl moiety carboxylate anion when irradiated with radiation in the wavelength range of about 2000 A. to about 4000 A., the method comprising the following steps;
(A) imagewise exposing said photopolymerizable material to radiation having a wavelength between about 3800 A. and about 7200 A. for a time sufficient to substantially initiate photopolymerization in the exposed area;
(B) uniformly irradiating said exposed photopolymerizable material with radiation having wavelengths between about 2000 A. and about 4000 A. for a sufficient time to cause said polymerization initiator system to become substantially insensitive to radiation have wavelength between about 3800 A. and aobut 7200 A.; and
(C) uniformly exposed said twice exposed photopolymerizable material with substantially intense radiation having wavelengths between about 3800 A. to about 7200 A. for a sufficient time to produce an intensified photopolymer optical image by substantial increase in optical density in the area exposed during the imagewise exposure step, said process steps produce a visible optical image.

11. The process of claim 10 wherein said catalyst compound is an organic sulfinic compound.

12. The process of claim 10 wherein said catalyst compound is a triorganosubstituted phosphine selected from the group consisting of tributylphosphine, triphenylphosphine, dibutylphenylphosphine, methyldiphenylphosphine and methylbutylphenylphosphine.

13. The process of claim 10 wherein said catalyst compound is a triorganosubstituted arsine selected from the group consisting of triphenylarsine, methyldiphenyl arsine, trioctyl arsine, dibutylphenyl arsine and methylbutylphenyl arsine.

14. The process of claim 10 wherein said monomer is a salt of a polyvalent metal compound.

15. The process of claim 10 wherein the optical density of said photopolymer image produced by said imagewise exposure lies between about 0.05 and about 0.8.

References Cited

UNITED STATES PATENTS

| | | | |
|---|---|---|---|
| 2,875,047 | 2/1959 | Oster | 96—115X |
| 2,996,381 | 8/1961 | Oster et al. | 96—115X |
| 3,042,519 | 7/1962 | Wainer | 96—115X |
| 2,989,455 | 6/1961 | Neugebauer et al. | 204—159.23 |
| 3,047,422 | 7/1962 | Sites et al. | 96—115X |
| 3,050,390 | 8/1962 | Levinos et al. | 96—35.1 |
| 3,144,331 | 8/1964 | Thommes | 96—48X |
| 3,331,761 | 7/1967 | Mao | 204—159.23 |
| 3,352,772 | 11/1967 | Mao | 204—159.24 |
| 3,380,825 | 4/1968 | Webers | 96—115X |
| 3,408,191 | 10/1968 | Jeffers | 96—35.1X |

OTHER REFERENCES

Oster, G.: "Photographic Science and Eng.," vol. 4, No. 4, July–August 1960, pp. 237–239.

NORMAN G. TORCHIN, Primary Examiner

C. L. BOWERS, JR., Assistant Examiner

U.S. Cl. X.R.

96—27, 35.1, 48, 115; 204—159.23, 159.24; 250—65